US008555286B2

(12) United States Patent
Flores et al.

(10) Patent No.: US 8,555,286 B2
(45) Date of Patent: Oct. 8, 2013

(54) METHOD, SYSTEM, AND APPARATUS FOR ESTABLISHING A SOFTWARE CONFIGURABLE COMPUTING ENVIRONMENT

(75) Inventors: Romelia H. Flores, Keller, TX (US); Leonard S. Hand, Red Creek, NY (US); Biao Hao, Bedford, TX (US)

(73) Assignee: International Business Machines Corporation, Armonk, NY (US)

( * ) Notice: Subject to any disclaimer, the term of this patent is extended or adjusted under 35 U.S.C. 154(b) by 2363 days.

(21) Appl. No.: 10/974,153

(22) Filed: Oct. 27, 2004

(65) Prior Publication Data

US 2006/0090162 A1 Apr. 27, 2006

(51) Int. Cl.
*G06F 9/46* (2006.01)

(52) U.S. Cl.
USPC .......... 718/104

(58) Field of Classification Search
USPC .......... 718/104
See application file for complete search history.

(56) References Cited

U.S. PATENT DOCUMENTS 4,943,909 A 7/1990 Huang
5,764,226 A * 6/1998 Consolatti et al. .......... 715/747
5,937,388 A 8/1999 Davis et al.
6,098,091 A 8/2000 Kisor
6,115,646 A 9/2000 Fiszman et al.
6,463,457 B1 10/2002 Armentrout et al.
7,178,144 B2 * 2/2007 Melchione et al. .......... 717/172
2002/0007389 A1 * 1/2002 Jones et al. .......... 709/104
2002/0026630 A1 2/2002 Schmidt et al.
2002/0059558 A1 5/2002 Hines
2003/0187846 A1 * 10/2003 Bangel et al. .......... 707/9

OTHER PUBLICATIONS

Thissen, D., "Flexible Service Provision Considering Specific Customer Resource Needs," Parallel, Distributed & Network-Based Processing, pp. 253-260, (Jan. 2002).

* cited by examiner

*Primary Examiner* — Mengyao Zhe
(74) *Attorney, Agent, or Firm* — Novak Druce Connolly Bove + Quigg LLP

(57) ABSTRACT

A software configurable computing environment can include at least one application disposed within the software configurable computing environment. The environment can also include a resource management engine configured to define at least one computing resource for the software configurable computing environment. A resource allocation engine can allocate the computing resources defined by the resource management engine for use in the software configurable computing environment. A resource utilization engine can perform at least one programmatic action for the application using available ones of the resources allocated by the resource allocation engine.

20 Claims, 5 Drawing Sheets

METHOD, SYSTEM, AND APPARATUS FOR ESTABLISHING A SOFTWARE CONFIGURABLE COMPUTING ENVIRONMENT

BACKGROUND

1. Field of the Invention

The present invention relates to the field of allocating resources in a computing environment and, more particularly, to modeling and implementing a software configurable computing environment.

2. Description of the Related Art

To be successful, a business must have the ability to quickly deliver new application services for use throughout the business's infrastructure. The deployment of the application services can require a testing, a development, and a production environment. The establishment of each of these environments can involve a multitude of expensive computing hardware and software.

The provisioning of a computing environment refers to the supplying of assets needed to create the environment, such as a server, a CPU, floor space in a lab, or even an individual. In the case of the provisioning of a testing environment, for example, special testing teams typically create a customized test environment for troubleshooting a newly developed application service. The test environment is implemented by provisioning hardware and software components, performing a series of tests on the new application service, and documenting results.

However, existing software and hardware based tools used to provision computing environments are limited. For example, existing provisioning tools are ill-equipped to handle the challenges posed by complex systems, such as, being able to efficiently provision assets based on a multitude of hardware and software possibilities and combinations. Further, existing provisioning tools are unable to handle the scheduling and provisioning of non-hardware or non-software assets, such as, lab floor space or technical personnel needed in the operation of a specific test. Additionally, provisioning tools are typically specific to one type of environment; therefore, a company must provide separate, dedicated hardware and software to provision a development, testing, and production environment respectively.

SUMMARY OF THE INVENTION

The present invention provides a method, system, and apparatus for implementing a computing environment and, more particularly, to creating reusable models using provisionable and re-purposeable entities. A computing environment, such as a development, test, or production environment, can be modeled using software configurable physical and virtual assets. The provisioning process can provide a flexible model which can facilitate the sharing of resources, and be retrofitted to accommodate other application services, or other types of environments. In addition, administrator definable thresholds can be introduced into the provisioning process in order to optimize the implementation in terms of critical factors, such as cost, location, priority, scheduling, or the like.

One aspect of the present invention can include a software configurable computing environment. The computing environment can include at least one application disposed within the environment, and a resource management engine configured to define at least one computing resource for the software configurable computing environment. In addition, the environment can include a resource allocation engine configured to allocate the computing resources defined by the resource management engine for use in the software configurable computing environment. Further, the environment can include a resource utilization engine configured to perform at least one programmatic action for the application using available ones of the resources allocated by the resource allocation engine. The environment can comprise a test environment, a development environment, or a production environment.

Another aspect of the present invention can include a method of establishing at least one application. The method can include selecting a plurality of computing resources. The method can also include reserving the selected computing resources for operations occurring within a software defined application environment, where the application is loaded into the application environment to perform programmatic actions for the application environment utilizing the reserved resources.

It should be noted that the invention can be implemented as a program for controlling a computer to implement the functions described herein, or a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

Figure 1:
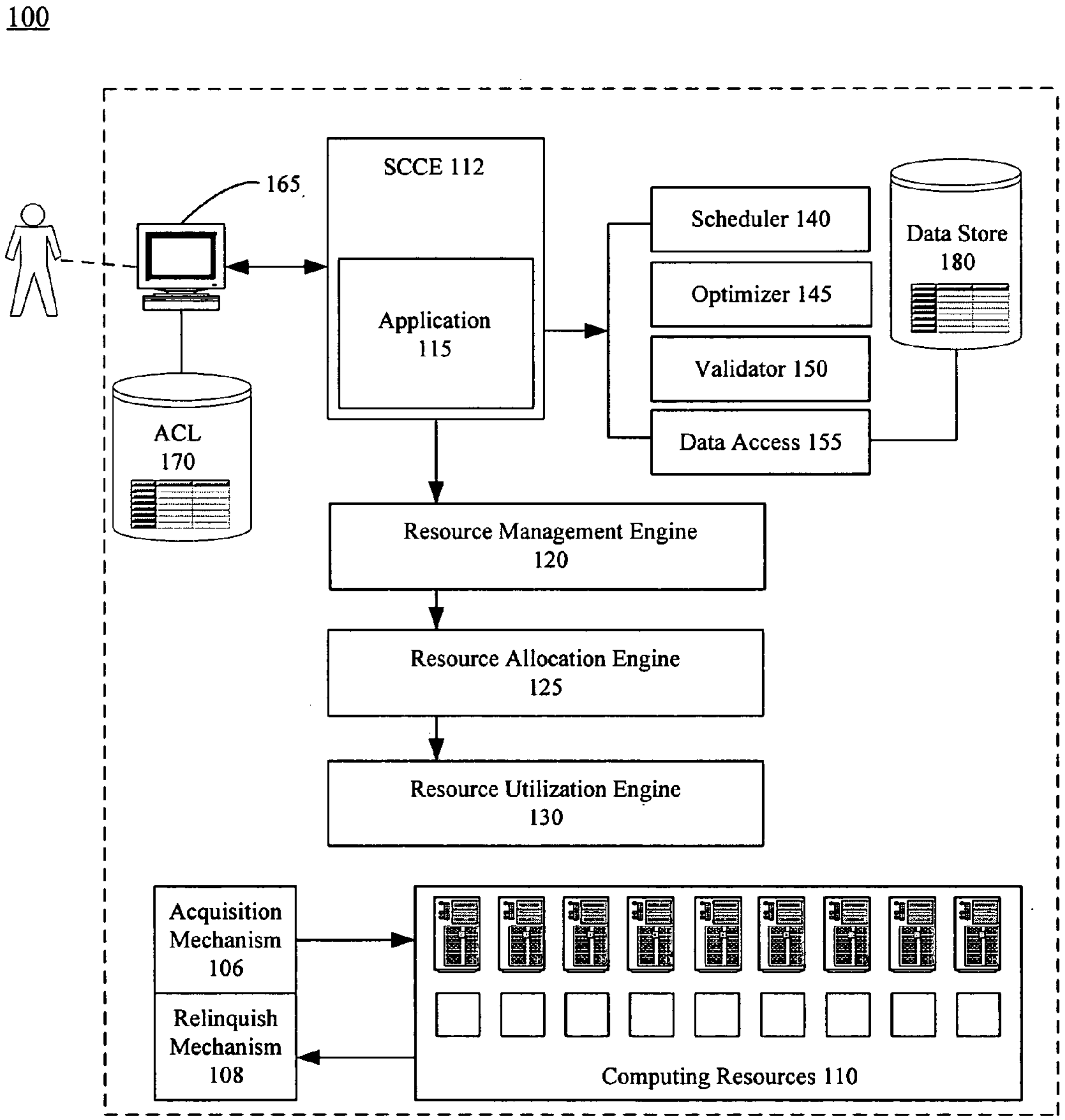
FIG. 1 is a schematic diagram illustrating a system 100 for creating a computing environment in accordance with one embodiment of the present invention.

FIG. 1 is a schematic diagram illustrating a system 100 for creating a software configurable computing environment (SCCE) 112 in accordance with one embodiment of the present invention. The SCCE 112 can be a software defined environment that includes a multitude of resources 110 available to it. The resources 110 can include defined computing resources, which can be used by one or more applications 115 installed and executing within the SCCE 112. Authorized users, as determined by an access control list 170, can utilize an interface 165 to configure the SCCE 112.

Resources 110 are not limited to computing resources and can instead include, but not limited to, human resources or person-hours, premise resources like building or room space, hardware resources such as computer hardware, and software resources like application licenses. Resources 110 can be allocated and de-allocated for the SCCE 112 using an acquisition mechanism 106 and a relinquish mechanism 108; the acquisition mechanism 106 acquiring assets that provide resources to the SCCE 112, and the relinquish mechanism 108 releasing assets that provide resources 110, which are no longer required or defined for the SCCE 112.

The SCCE 112 can utilize a resource allocation engine 125, a resource management engine 120, and a resource utilization engine 130. The resource allocation engine 125 can allocate assets that provide the resources 110 for use by the SCCE 112. When allocating resources 110, the resource allocation 125 can utilize the acquisition mechanism 106 and the relinquish mechanism 108. Notably, the resources 110 provided by different assets can vary over time, depending on network traffic, asset performance, and other miscellaneous factors.

In one embodiment, the resource allocation engine 125 can assure that sufficient assets of appropriate types are allocated to provide a user-defined quantity of resources 110. The actual assets that provide the user-defined resources can be abstracted from the user by the resource allocation engine 125. Further, the actual assets used by the resource allocation engine 125 to provide the user-defined resources can dynamically shift from time to time in a user-transparent fashion. The resource allocation engine 125 can be implemented, for example, using the IBM Tivoli® Provisioning Manager™ and the IBM TotalStorage® Productivity Center™ with Advanced Positioning.

The resource utilization engine 130 can perform one or more programmatic actions for the application 115 using resources available to the SCCE 112. Such programmatic actions can utilize one or more of the resources 110 allocated by the resource allocation engine 125 that are managed by the resource management engine 120. Consequently, the resource utilization engine 130 can link available resources of the SCCE 112 with the application tasks that consume those resources.

The resource management engine 120 can manage the resources 110 of the SCCE 112, mapping resources 110 to assets that provide the resources 110, determining which resources 110 are in use, which are available, and the like. Hence, the resource management engine 120 can provide for the ordered flow of resources 110 within the SCCE 112, thereby functioning, in part, as a communication intermediary between the resource allocation engine 125 and the resource utilization engine 130.

In one embodiment, the SCCE 112 can optionally utilize a scheduler 140, an optimizer 145, a validator 150, and a data access engine 155. The scheduler 140 can be configured to maintain a schedule for resources 110 of the SCCE 112 so that different resources 110 can be reserved for use at different times. In one embodiment, the application 115 can submit tasks to the scheduler 140. Each submitted task can include task specific metrics, such as an execute-no-later-than time, a criticality level of the task, an estimation of resources consumed by the task, and other such data. Each of these tasks can be queued by the scheduler 140 to be executed in a prioritized fashion based upon resource 110 availability.

The resource optimizer 145 can monitor availability of the resources 110 within the SCCE 112. The resource optimizer 145 can resource optimizer 145 can dynamically adjust the resources 110 allocated to one or more software configurable environments 112 based upon the availability of the resources 110. In so doing, the resource optimizer 145 can add unallocated resources to the SCCE 112 in a dynamic fashion on either a temporary or a permanent basis. The resource optimizer 145 can also redistribute resources 110 already assigned from one defined environment to another, based upon resource need, thereby either providing additional resources to the SCCE 112 or removing resources 110 from the SCCE 112. Further, in one embodiment, minimum and maximum adjustment thresholds can be associated with the SCCE 112, where the resource optimizer 145 cannot add resources 110 beyond the maximum adjustment threshold and cannot remove resources 110 below the minimum adjustment threshold. Further, when resources 110 used by the SCCE 112 are associated with a cost, the resource optimizer 145 can handle the cost allocation details associated with "buying" resources from the SCCE 112 and/or "selling" resources to the SCCE 112.

The resource validator 150 can monitor resource quality and/or asset performance to identify resource 110 deficiencies. A deficiency can include a shortcoming or defect in the resource 110, such as the inability to satisfy scheduling requirements. For example, when real-time processing is needed and a resource 110 is provided too slowly due to network bottlenecks, the resource validator 150 can identify the deficiency. Further, the validator 150 can monitor the allocation of the resources 110 to determine if efficient use has been made of the resources 110. Consequently, if an extremely fast or high quality resource 110 is being used for a task that does not require the provided performance level, a different, lower quality resource 110 can be substituted under the assumption that the high quality resource 110 is needed for a different, more demanding task.

The data access engine 155 can abstract data storage and retrieval details from the SCCE 112. Notably, the SCCE 112 can rely upon a plurality of different distributed storage spaces and methodologies, the management of which can be complex. The data access engine 155 can provide for the efficient selection, retrieval, and storage of data within the SCCE 112. The data access engine 155 can comprise one or more management components. The data access engine 155 can access local information from any memory or data store 180 be it a temporary memory space or a persistent memory space. Further, the data access engine 155 can access local data stores, networked data stores, and Web based data stores. The data access engine 155 can also access data stored in any of a variety of formats including a file format or a database format.

In operation, the system 100 can allow a user, such as an environment administrator, to construct an environment, such as the software configurable computing environment 112 using an interface 165. In one embodiment, the interface 165 can allow a user to view and modify the SCCE 112 prior to implementation. The interface 165 can also permit the emulation of projected conditions of the SCCE 112 within a pre-deployment stage to detect potentially problematic situations with the constructed environment before the environment is created and in use.

Once the SCCE 112 has been created, one or more applications 115 can be deployed in the SCCE 112. When executing, application tasks can be performed using the resources 110 defined for the SCCE 112.

Figure 2:
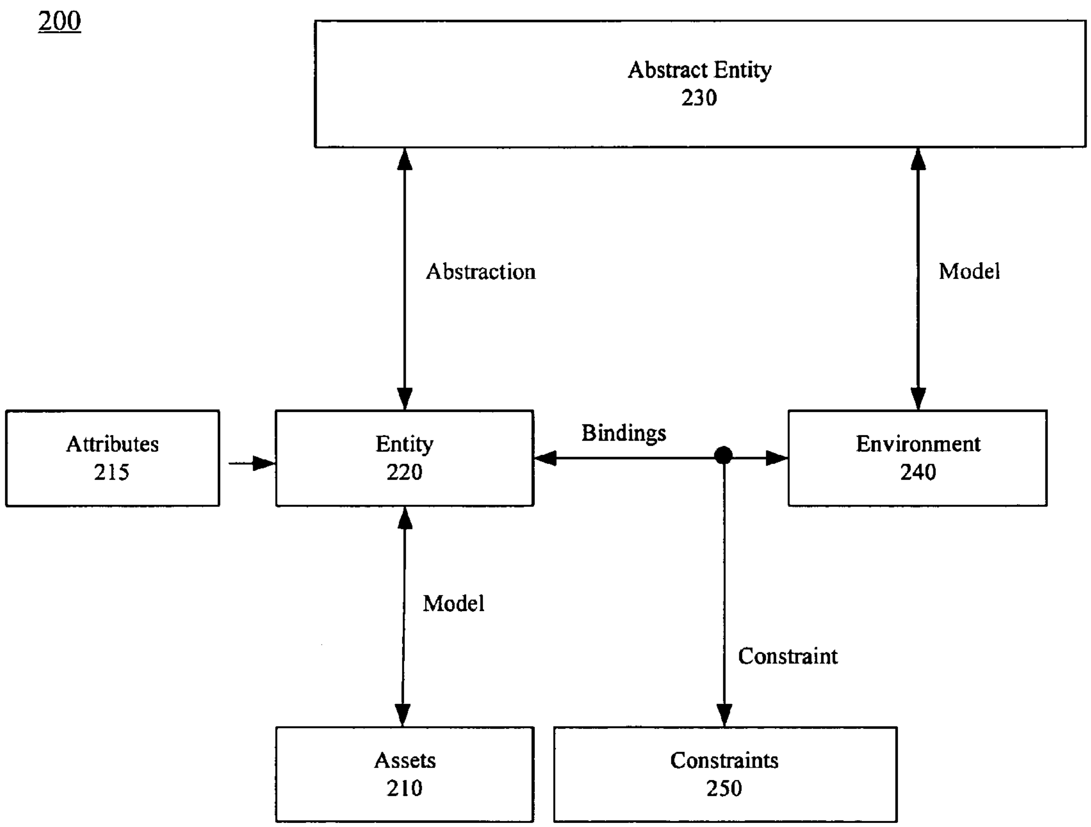
FIG. 2 is a schematic diagram illustrating a method 200 of creating a computing environment in accordance with one embodiment of the present invention.

FIG. 2 is a schematic diagram illustrating a method 200 of implementing environment 240 in accordance with an embodiment of the inventive arrangements disclosed herein. The environment 240 can be a SCCE like SCCE 112.

The environment 240 can utilize a plurality of assets 210, each asset 210 being a resource providing unit. A resource provided by the asset 210 can be a consumable of the environment 240. Resources can represent computing resources, personnel resources, or premise resources. For example, resources can include processing cycles, data storage space, bandwidth, application usage, person-hours, workspace and equipment utilization, or the like.

Assets 210 can include physical or virtual assets. Many different categories of assets 210 can exist including, but not limited to, hardware computing assets, software computing assets, human agents, workspaces, and office equipment. The assets 210 can be grouped into environment construction building blocks called entities 220.

Each entity 220 can be a software definable unit consisting of one or more assets 210. Each entity 220 can be customized to any of a variety of levels of granularity. Accordingly, entities 220 can represent logical groupings of assets 210, each grouping including the assets 210 necessary to support a definable segment of the environment 240. For example, one of the entities 220 can be used to represent multiple assets 210 associated with supporting an individual worker, a software application, a software development team, a project, or the like.

In one embodiment, an entity 220, which is not dependant upon any other entity, which consists of one and only one asset 210, can be referred to as a base entity. A base entity represents the lowest available non-sharable asset 210, and is the lowest entity 220 that can be singularly scheduled for an environment 240.

In another embodiment, the entity 220 can be configured to comprise a plurality of distributed, communicatively linked child entities that together provide the computing resources for entity 220. Accordingly, the entity 220 functions as the sum of each of the child entities.

In still another embodiment, a grouping of linked entities 220 can be established, each of the linked entities 220 sharing resources provided by a pool of assets 210 defined by the linked entities 220. Resources provided by this asset pool can be selectively used by any of the entities 220 in the linkage in accordance with details established for the linkage. It should be appreciated that a linkage of entities 220 can result in an efficient utilization of assets 210. The assets 210 of the pool can be physically distributed across a physical network. The plurality of entities 220 in the linkage can be logically distributed across a plurality of software defined environments.

One or more administrator definable attributes 215 can be established and imposed upon each entity 220. Each attribute 215 can represent one or more threshold values, the values being ceiling or floor values for resources. Using attributes 215, a range of resources can be established. Consequently, one of the attributes 215 can define a minimum quantity of resources available to an entity 220 at any one time. Another one of the attributes 215 can define a maximum quantity of resources available to an entity 220 at any one time.

For example, the attributes 215 can specify that an entity 220 is to have a minimum of 10 Gigabytes of RAM and a maximum of 20 Gigabytes of RAM available to it. In another example, an entity 220, which describes a bandwidth can have associated attributes 215 that establish an operational throughput, such as between 1.5 Megabits per second and 3.2 Megabits per second.

One or more constraints 250 can also be established for an entity 220. Each constraint 250 can be a limitation placed upon the entity 220 not directly related to a resource consumption level. Instead, constraint 250 can represent an environment specific or usage specific limitation. Constraints 250 can be limitations relating to budgetary values, scheduling, priority, and the like.

For example, an entity 220 can represent a particular user of the environment 240. The user can have an associated usage budget for each month. Constraint 250 can be a usage ceiling for that user. For example, the user can be granted one hundred usage units a month, where each hour of usage time from 9 AM to 5 PM equals four usage units and each hour of usage time outside this range equals one usage unit. When the entity 220 (user) has exceeded his/her usage limit (constraint 250) for the month, either the user will be unable to access the environment 240, or the user will incur additional usage charges.

In another example, entity 220 can represent a low-priority administrative routine that is to run within the environment 240, thereby requiring the consumption of a known quantity of resources. Constraint 250 can permit the entity 220 to exist within the environment 240, only when the resources available to the environment 240 are forty percent utilized or less.

Another type of entity 220 is an abstract entity 230. An abstract entity 230 can describe a function, service, or need in general terms, where specific implementation details are not critical. Unlike normal entities 220 having resources provided from defined assets 210, abstract entities 230 can receive resources in a number of different manners.

In one embodiment, a set of entities 220 can be used to define a pool of resources that abstract entities 230 can utilize. In another embodiment, abstract entities 230 can utilize resources linked to entities 220 that are not presently being consumed by those entities 220. Thus, abstract entities 230 can utilize resource overages from the entities 220. In still another embodiment, abstract entities 230 can utilize resources provided by assets 210 that are available but not allocated to any defined entities 220. An environment 240 constructed entirely of abstract entities 230 can function in a dynamic fashion, where resources available to the abstract entities 230 can dynamically shift depending on resources consumed by other ones of the abstract entities 230.

By way of example, the environment 240 can consist of three abstract entities 230; webserverAE, applicationserverAE, and databaseserverAE. These abstract entities 230 can together form a 3-tier application test environment. A resource utilization engine of the environment 240 can allocate the databaseserverAE to any one of a variety of physical servers depending on availability, space, or the like. For example, the databaseserverAE can be an IBM® server or an Oracle® server. When selecting the physical server for the databaseserverAE, attributes 215 and constraints 250 associated with the abstract entity 230 can be considered. The allocation of the physical server for databaseserverAE can be outwardly transparent.

Notably, each abstract entity 230 can be composed of one or more other entity, each of which can be abstract entities 230. For example, the webServerAE can be formed from an abstract operating system (OS) and an abstract server. The abstract OS can be called OSAE and the abstract server can be called ServerAE. Both OSAE and ServerAE can include one or more attributes 215 and/or constraints 250.

Figure 3:
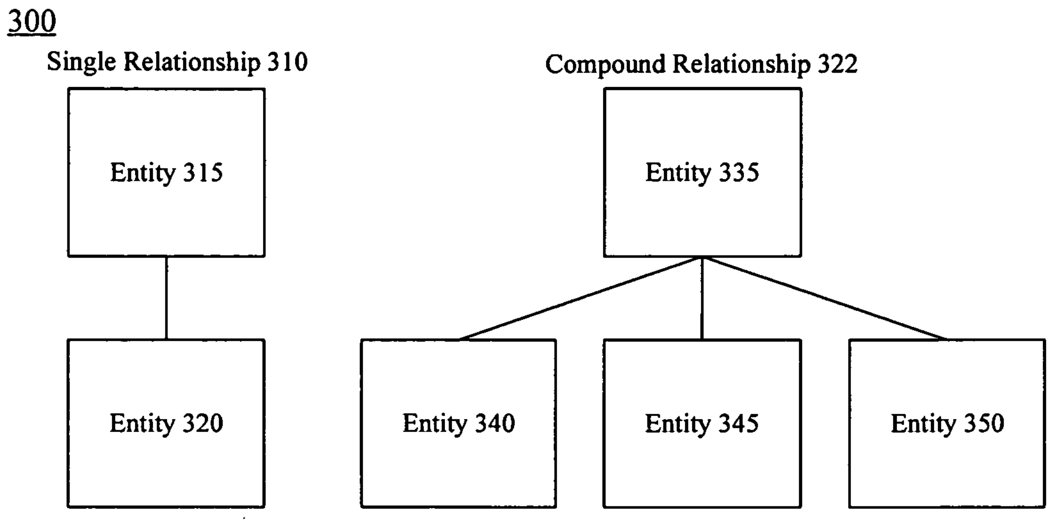
FIG. 3 is a schematic diagram illustrating a method of creating relationships among entities in accordance with another embodiment of the present invention.

FIG. 3 is a schematic diagram illustrating a method 300 of creating relationships among entities in accordance with another embodiment of the present invention. Entity-to-entity relationships can be single relationships 310 or compound relationships 322. In a single relationship 310, an entity 315 can be related to an entity 320. In a compound relationship 322, an entity 335 can be related to entity 340, entity 345, and entity 350.

Many different types of relationships can exist among entities, including parent-child couplings and inheritance relationships. Each linkage in a compound relationship 322 can separately define the relationship type. For example, the entity 335 can inherit constraints from entity 340, can be a parent of entity 345, and can share resources with entity 350.

Any of a variety of notations can be used to indicate the relationships among entities. One such notation (that assumes common relationships exist among entities) can indicate relationship 310 as Entity315:=(Entity320) and entity relationship 322 as Entity335:=(Entity340^Entity345^Entity350). It should be appreciated that the aforementioned relationships can be equally applied to abstract entities and normal entities.

Figure 4:
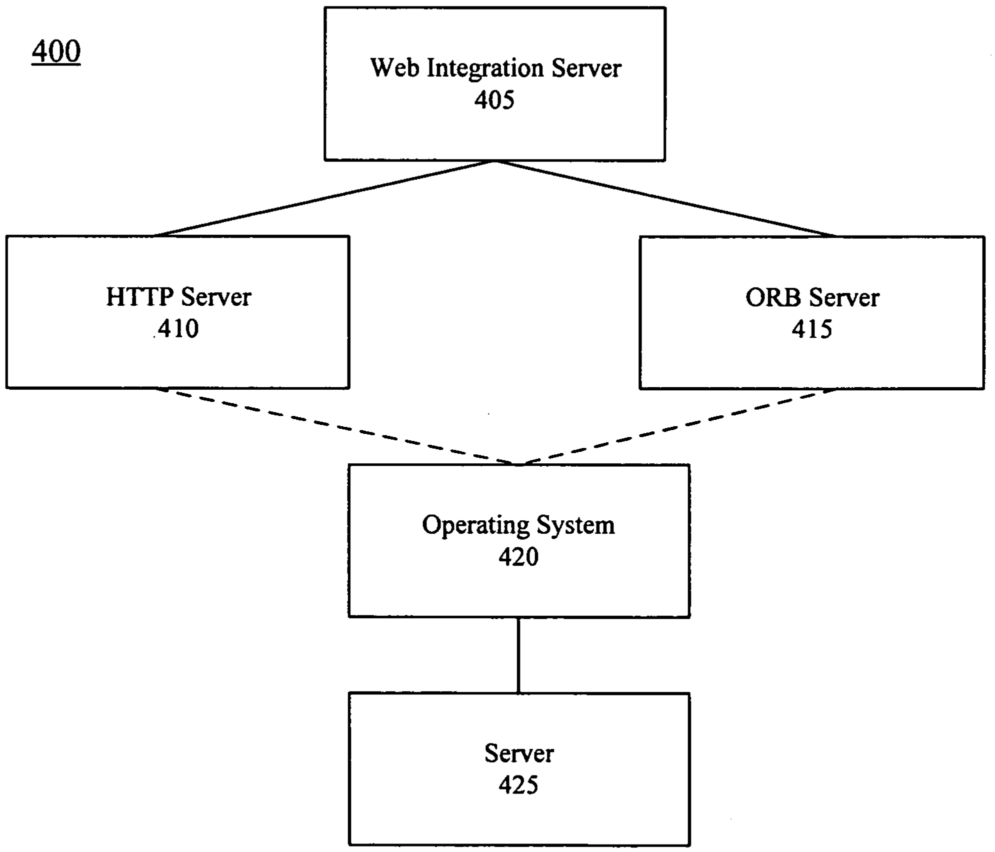
FIG. 4 is a schematic diagram illustrating entity relationship for a Web integration server.

FIG. 4 is a schematic diagram illustrating entity relationship 400 for a Web integration server 405. As shown, Web Integration server 405 can have a compound relationship with both object request broker (ORB) server 415 and an HTTP server 410, both of which have a relationship with operating system 420, disposed on server 425.

Figure 5:
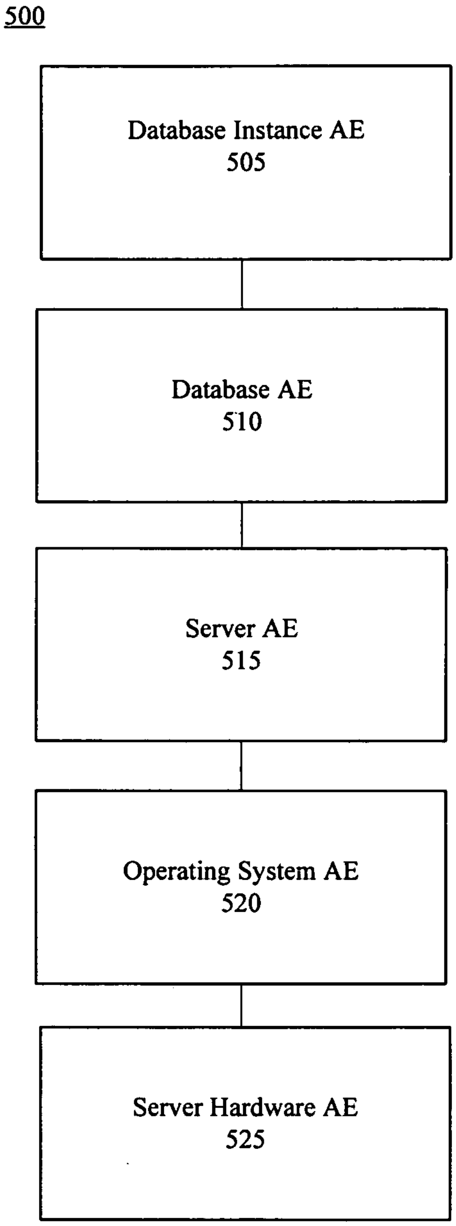
FIG. 5 is a schematic diagram illustrating an entity relationship 500 between abstract entities.

FIG. 5 is a schematic diagram illustrating an entity relationship 500 between entities 505-525. In relationship 500, a database instance 505 can reside upon database 510. The database 510 can be hosted upon server 515. The server 515 can utilize operating system 520 that relies upon server hardware 525 to function. One or more of the entities 505-525 can be abstract entities.

Figure 6:
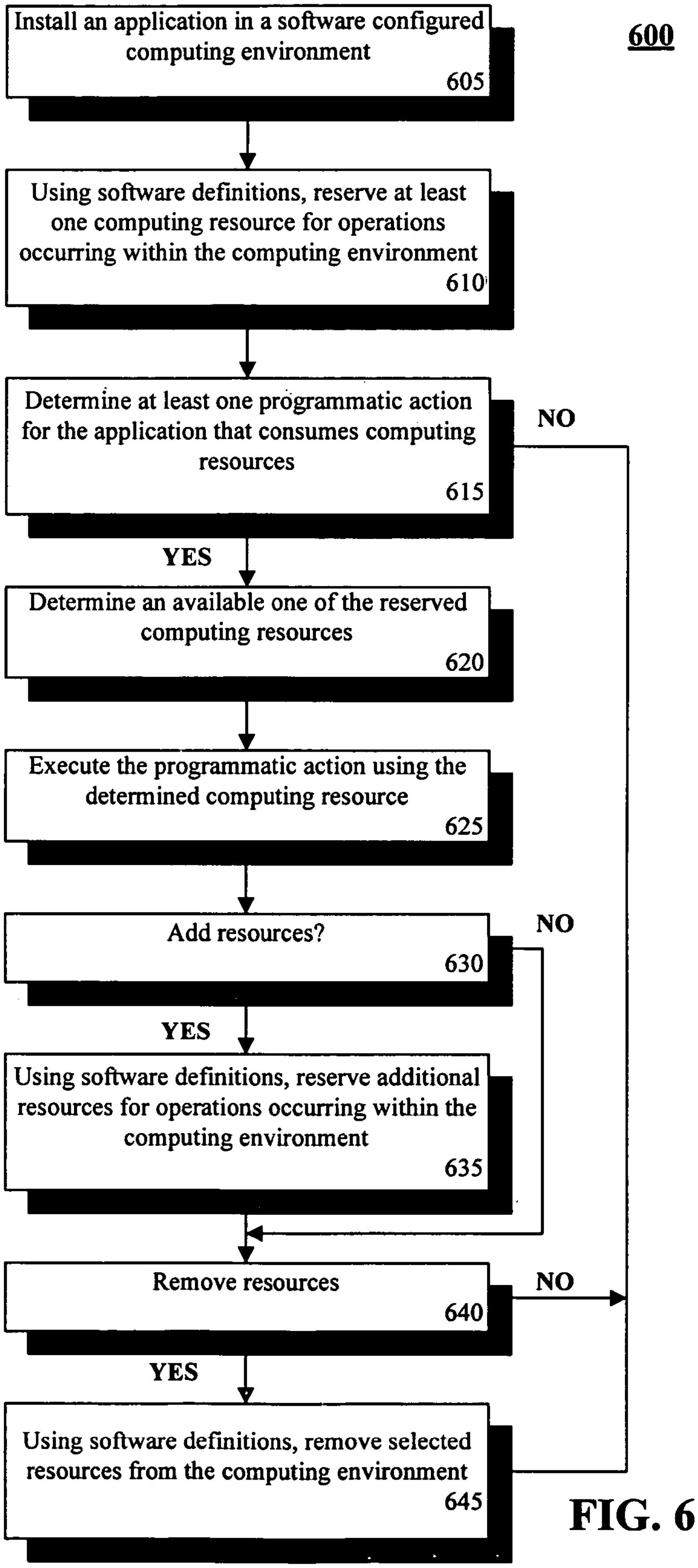
FIG. 6 is a flow chart illustrating a method 600 for using an application within a software configurable computing environment in accordance with one embodiment of the present invention.

FIG. 6 is a flow chart of a method 600 for executing an application within a software configurable computing environment, such as the SCCE 112 of system 100. The method can begin in step 605, when an application can be installed within the software configured computing environment. In step 610, using software definitions established for the environment, at least one computing resource can be reserved for operations occurring within the computing environment. For example, an authorized administrator can use an environment creation interface to create one or more entities for the software configurable computing environment. In such an example, the entities define the resources that are reserved for the environment.

In step 615, at least one programmatic action associated with the application that consumes computing resources can be determined. In step 620, an available resource(s) needed for performing the programmatic action can be determined. In step 625, the programmatic action can be executed using the determined computing resource(s).

In step 630, a determination can be made as to whether more resources are to be added to the environment. If not, the method can skip step 635 and proceed to step 640. If so, the method can proceed to step 635, where one or more additional resources can be reserved for operations occurring within the software configurable computing environment. Software definitions added to the configurable environment via the user interface can specify entities that are to provide the additional resources. In step 640, a determination can be made as to whether one or more currently reserved resources are to be removed from the environment. If not, the method can loop to step 615, where additional programmatic actions associated with the loaded application can be determined. If resources are to be removed, however, the method can proceed from step 640 to step 645.

In step 645, software definitions (entered through an interface to the software configurable computing environment) can remove resources from the environment that were previously available to the environment. The method can proceed from step 645 to step 615, where additional programmatic actions, which consume resources, can be detected.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented system for establishing a software configurable computing environment comprising:

a processor; and a computer-readable medium having stored thereon a plurality of instructions for causing the processor to:

install and execute at least one application within the software configurable computing environment, wherein the software configurable computing environment includes a testing, a development, or a production environment;

configure the software configurable computing environment based on commands from an authorized user, determined by an access control list, utilizing an interface, wherein the interface allows the authorized user to view and modify the software configurable computing environment prior to implementation of the at least one application, the configuring comprising reserving resources of the system to support the software configurable computing environment to yield reserved resources and generating software definitions specifying assets providing the reserved resources and other resources of the system;

placing at least one constraint on the at least one application, wherein the at least one constraint includes permitting the application to exist within the software configurable computing environment only when resources available to the environment are below a threshold;

determining at least one programmatic action for the at least one application that consumes computing resources;

performing the at least one programmatic action for the at least one application by allocating available ones of the reserved resources; and defining a resource allocation engine configured to, based on the software definitions, dynamically allocate resources to the at least one application and selectively adjust the reserved resources using, an acquisition mechanism for adding additional resources to the reserved resources based on the software definitions when the reserved resources are insufficient and a relinquish mechanism for releasing one or more of the reserved resources that are no longer required to yield released resources, wherein the additional resources are selected from the other resources, and wherein the released resources are added to the other resources.

2. The system of claim 1, wherein said environment comprises at least one environment selected from the group consisting of a test environment, a development environment, and a production environment.

3. The system of claim 2, wherein said at least one environment comprises a plurality of environments, each environment having a separate set of allocated resources.

4. The system of claim 1, wherein at least a portion of said computing resources are provided by a network of communicatively linked, geographically dispersed computing devices.

5. The system of claim 1, further comprising:

a resource optimizer configured to monitor availability of resources and to dynamically adjust resource allocations based upon monitored availability of resources.

6. The system of claim 1, further comprising:

a resource validator configured to determine whether said computing resources are usable by the resource utilization engine.

7. A method for establishing a software configurable environment comprising the steps of:

installing and executing at least one application within the software configurable computing environment in a system, wherein the software configurable computing environment includes a testing, a development, or a production environment;

configuring the software configurable computing environment by an authorized user, determined by an access control list, utilizing an interface, wherein the interface allows the authorized user to view and modify the software configurable computing environment prior to implementation of the at least one application, the configuring comprising reserving resources of the system to support the software configurable computing environment to yield reserved resources and generating software definitions specifying assets providing the reserved resources and other resources of the system;

placing at least one constraint on the at least one application, wherein the at least one constraint includes permitting the application to exist within the software configurable computing environment only when resources available to the environment are below a threshold;

determining at least one programmatic action for the at least one application that consumes computing resources;

performing the at least one programmatic action for the at least one application by allocating available ones of the reserved resources; and based on the software definitions, dynamically allocating resources to the at least one application by a resource allocation engine and selectively adjusting the reserved resources using, an acquisition mechanism for adding additional resources to the reserved resources based on the software definitions when the reserved resources are insufficient and a relinquish mechanism for releasing one or more of the reserved resources that are no longer required to yield released resources, wherein the additional resources are selected from the other resources, and wherein the released resources are added to the other resources.

8. The method of claim 7, further comprising the steps of:

administratively adding a new resource to said software configurable environment using software associated with the software configurable environment, wherein said added resource is available to be used by the at least one application.

9. The method of claim 7, further comprising the steps of:

administratively removing one of said resources from the software configurable environment using software associated with the software configurable environment, wherein the removed resource is not available to be used by the at least one application.

10. The method of claim 7, further comprising the step of:

defining within the software configurable environment at least one entity using software associated with the software configurable environment, each entity configured to provide at least one of the resources.

11. The method of claim 10, wherein said at least one entity comprises computing resources provided by a plurality of computing devices.

12. The method of claim 10, wherein said at least one entity comprises an asset, said asset selected from at least one of a hardware device, a geographical location, and a software resource.

13. The method of claim 7, further comprising the step of:

defining within the software configurable environment at least one abstract entity using software associated with the software configurable environment, each abstract entity configured to describe a function requiring at least one of the resources, wherein said executed programmatic actions consume resources defined by the at least one abstract entity.

14. A machine readable storage, having stored thereon a computer program having a plurality of code sections executable by a machine for causing the machine to perform the steps of:

installing and executing at least one application within the software configurable computing environment in a system, wherein the software configurable computing environment includes a testing, a development, or a production environment;

configuring the software configurable computing environment by an authorized user, determined by an access control list, utilizing an interface, wherein the interface allows the authorized user to view and modify the software configurable computing environment prior to implementation of the at least one application, the configuring comprising reserving resources of the system to support the software configurable computing environment to yield reserved resources and generating software definitions specifying assets providing the reserved resources and other resources of the system;

placing at least one constraint on the at least one application, wherein the at least one constraint includes permitting the application to exist within the software configurable computing environment only when resources available to the environment are below a threshold;

determining at least one programmatic action for the at least one application that consumes computing resources;

performing the at least one programmatic action for the at least one application by allocating available ones of the reserved resources; and based on the software definitions, dynamically allocating resources to the at least one application by a resource allocation engine and selectively adjusting the reserved resources using, an acquisition mechanism for adding additional resources to the reserved resources based on the software definitions when the reserved resources are insufficient and a relinquish mechanism for releasing one or more of the reserved resources that are no longer required to yield released resources, wherein the additional resources are selected from the other resources, and wherein the released resources are added to the other resources.

15. The machine readable storage of claim 14, further comprising the steps of:

administratively adding a new resource to said software configurable environment using software associated with the software configurable environment, wherein said added resource is available to be used by the application.

16. The machine readable storage of claim 14, further comprising the steps of:

administratively removing one of said resources from the software configurable environment using software associated with the software configurable environment, wherein the removed resource is not available to be used by the application.

17. The machine readable storage of claim 14, further comprising the step of:

defining within the software configurable environment at least one entity using software associated with the software configurable environment, each entity configured to provide at least one of the resources.

18. The machine readable storage of claim 17, wherein said at least one entity comprises computing resources provided by a plurality of computing devices.

19. The machine readable storage of claim 17, wherein said at least one entity comprises an asset, said asset selected from at least one of a hardware device, a geographical location, and a software resource.

20. The machine readable storage of claim 14, further comprising the step of:

defining within the software configurable environment at least one abstract entity using software associated with the software configurable environment, each abstract entity configured to describe a function requiring at least one of the resources, wherein said executed programmatic actions consume resources defined by the at least one abstract entity.

* * * * *